(12) United States Patent
Lee et al.

(10) Patent No.: US 9,891,609 B2
(45) Date of Patent: Feb. 13, 2018

(54) CENTRAL CONTROL APPARATUS FOR CONTROLLING FACILITIES AND FACILITY CONTROL SYSTEM HAVING THE SAME

(71) Applicant: LG ELECTRONICS INC., Seoul (KR)

(72) Inventors: Dongkyu Lee, Seoul (KR); Sangchul Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,481

(22) PCT Filed: Jul. 2, 2015

(86) PCT No.: PCT/KR2015/006814
§ 371 (c)(1),
(2) Date: Jan. 6, 2017

(87) PCT Pub. No.: WO2016/006871
PCT Pub. Date: Jan. 14, 2016

(65) Prior Publication Data
US 2017/0205787 A1    Jul. 20, 2017

(30) Foreign Application Priority Data

Jul. 8, 2014  (KR) .......................... 10-2014-0085392

(51) Int. Cl.
*G05B 13/00* (2006.01)
*B65G 15/00* (2006.01)
(Continued)

(52) U.S. Cl.
CPC .............. *G05B 19/042* (2013.01); *H02J 3/00* (2013.01); *H02J 13/0013* (2013.01);
(Continued)

(58) Field of Classification Search
CPC .................. G05B 13/048; G05B 15/02; G05B 2219/2639; Y04S 20/34; Y04S 20/40
(Continued)

(56) References Cited

U.S. PATENT DOCUMENTS 8,140,193 B2    3/2012  Lee
8,738,334 B2    5/2014  Jiang et al.
(Continued)

FOREIGN PATENT DOCUMENTS

KR    20120031379    4/2012
KR    20140075617    6/2014

OTHER PUBLICATIONS

International Search Report and Written Opinion dated Oct. 15, 2015 issued in Application No. PCT/KR2015/006814.
(Continued)

*Primary Examiner* — Michael J Brown
(74) *Attorney, Agent, or Firm* — Ked & Associates LLP

(57) ABSTRACT

This specification relates to a central control apparatus, which is configured to calculate time-division power usage as predicted power usage, which is consumed by at least one facility in a control area within a specific time section, on the basis of predicted external temperature corresponding to the control area within the specific time section and a time-division model, calculate variable-based degree day (VBDD) daily power usage as predicted daily power usage corresponding to the control area on the basis of the predicted external temperature and a VBDD model, and calculate final power usage as final predicted power usage consumed in the control area within the specific time section on the basis of the time-division power usage and the VBDD daily power usage, and a facility control system including the same.

13 Claims, 5 Drawing Sheets

(51) Int. Cl.
 *G05B 19/042* (2006.01)
 *H02J 13/00* (2006.01)
 *H02J 3/00* (2006.01)
 G05B 13/04 (2006.01)
 G05B 15/02 (2006.01)
(52) U.S. Cl.
 CPC ............ *G05B 13/048* (2013.01); *G05B 15/02* (2013.01); *G05B 2219/2639* (2013.01); *G05B 2219/2642* (2013.01); *H02J 2003/007* (2013.01); *Y04S 20/34* (2013.01); *Y04S 20/40* (2013.01)
(58) Field of Classification Search
 USPC ........................................ 700/275, 278, 291
 See application file for complete search history.

(56) References Cited

U.S. PATENT DOCUMENTS

2015/0198962 A1* 7/2015 Shiel .................. F24D 19/1048
 700/291
2015/0331023 A1* 11/2015 Hwang ................ G06Q 10/04
 702/60

OTHER PUBLICATIONS

Korean Office Action dated May 9, 2015 issued in Application No. KR10-2014-0085392 (with English Translation).
Korean Notice of Allowance dated Aug. 21, 2015 issued in Application No. KR10-2014-0085392 (with English Translation).

\* cited by examiner

[Fig. 1]
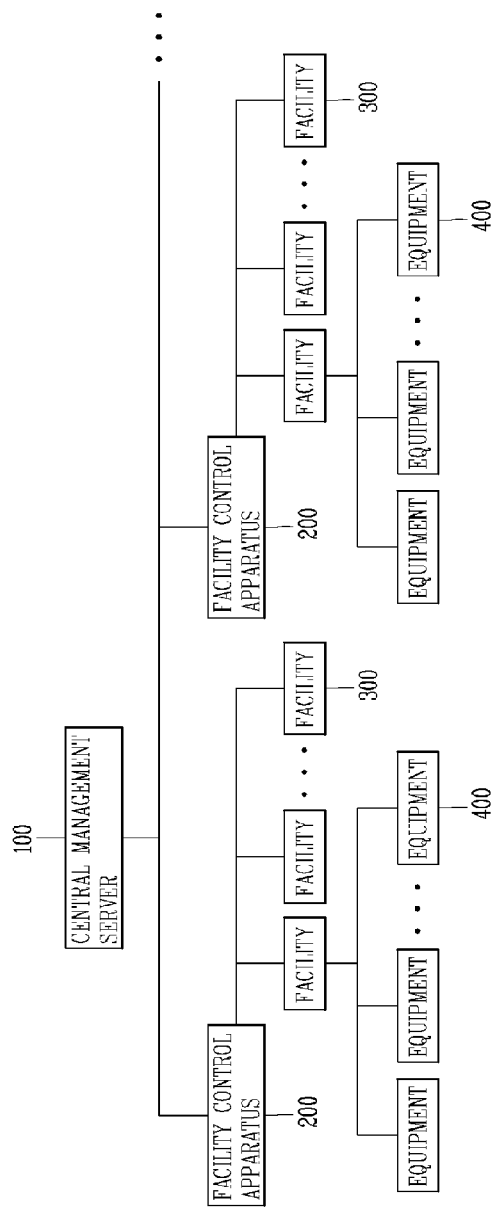
[Fig. 2]
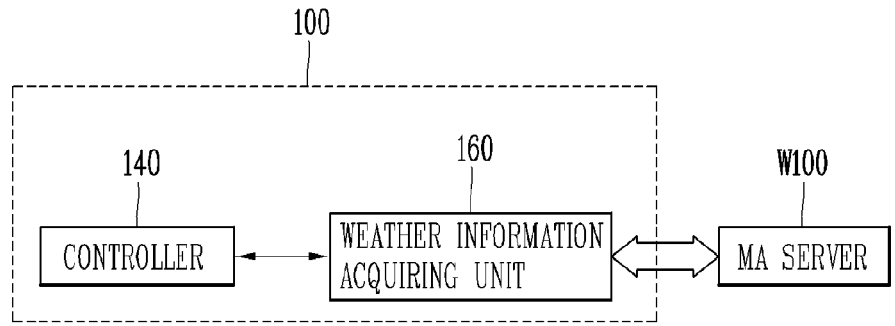

[Fig. 3]
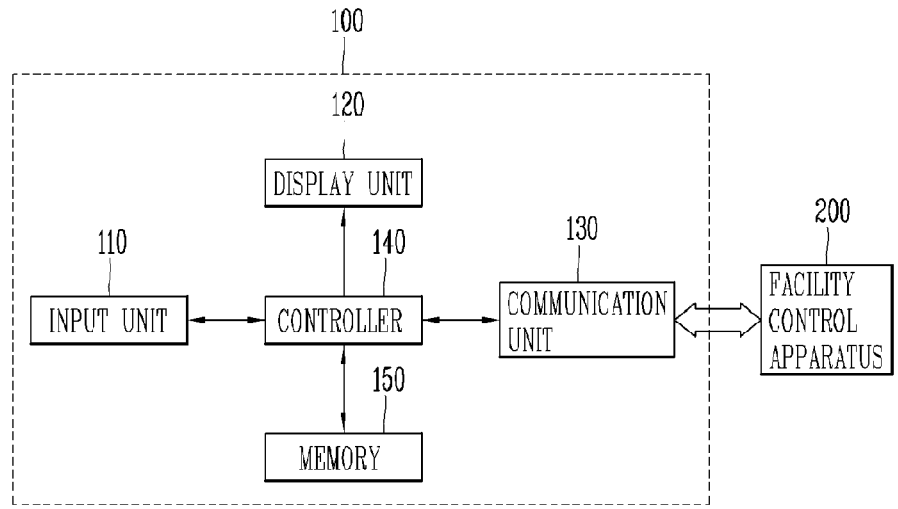
[Fig. 4]
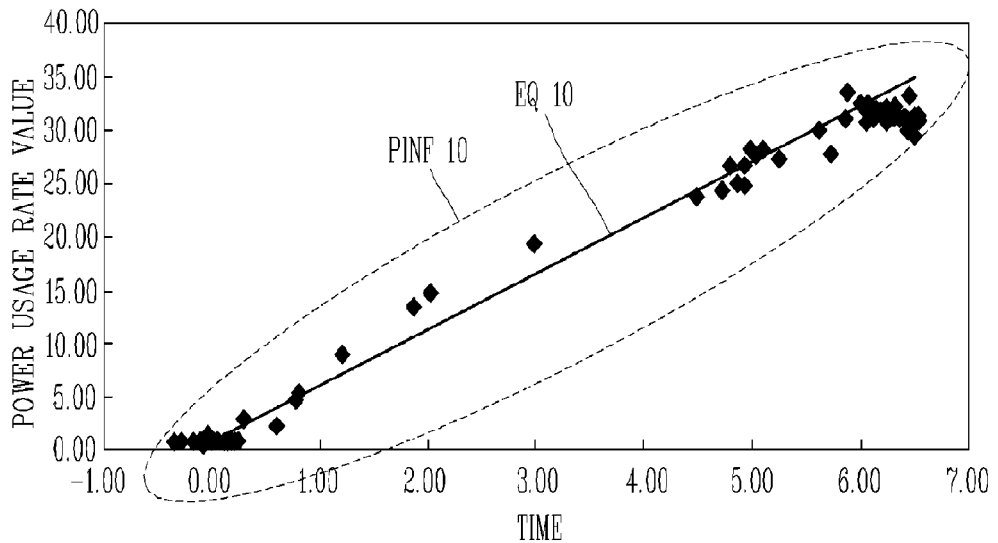
[Fig. 5]
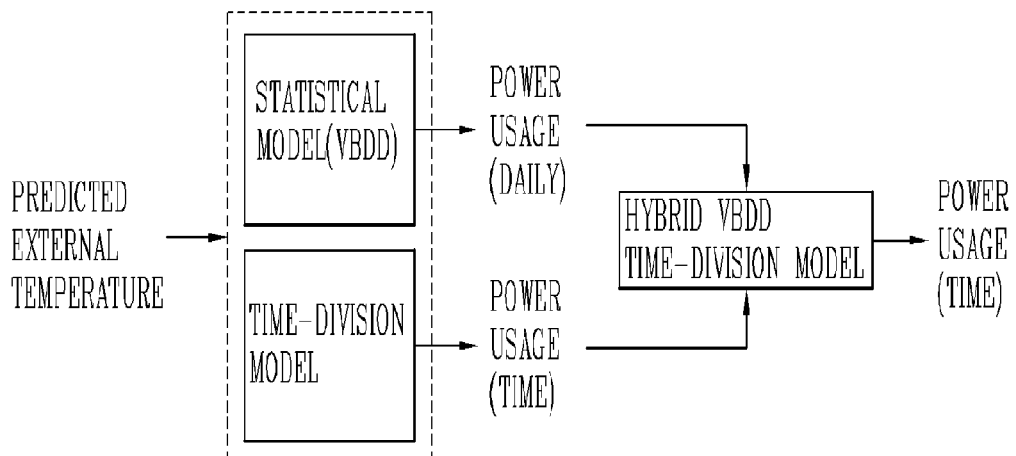

[Fig. 6]
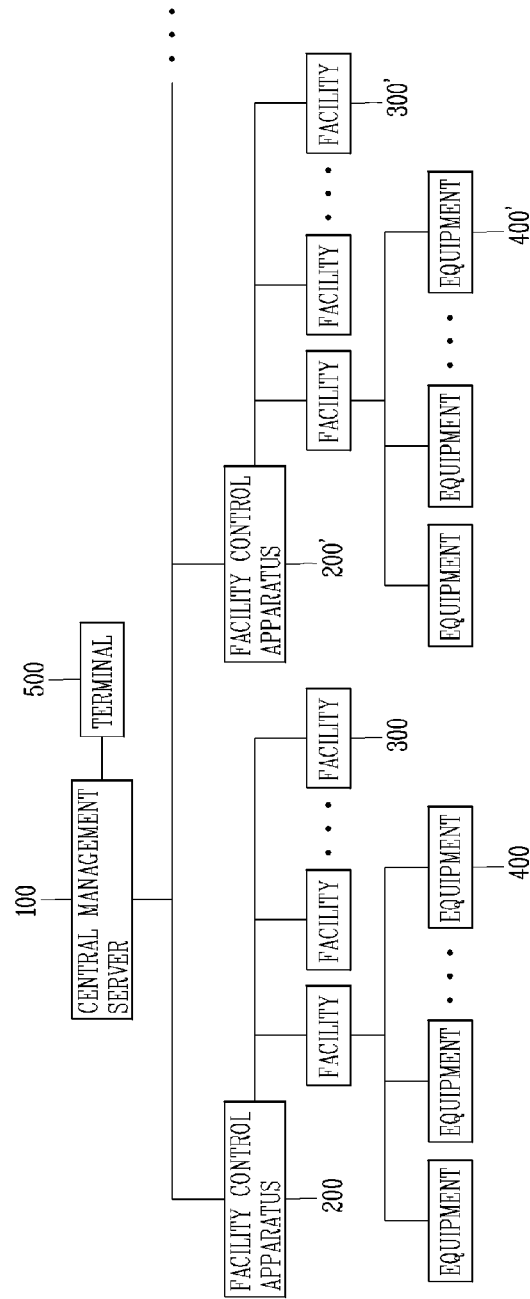

[Fig. 7]
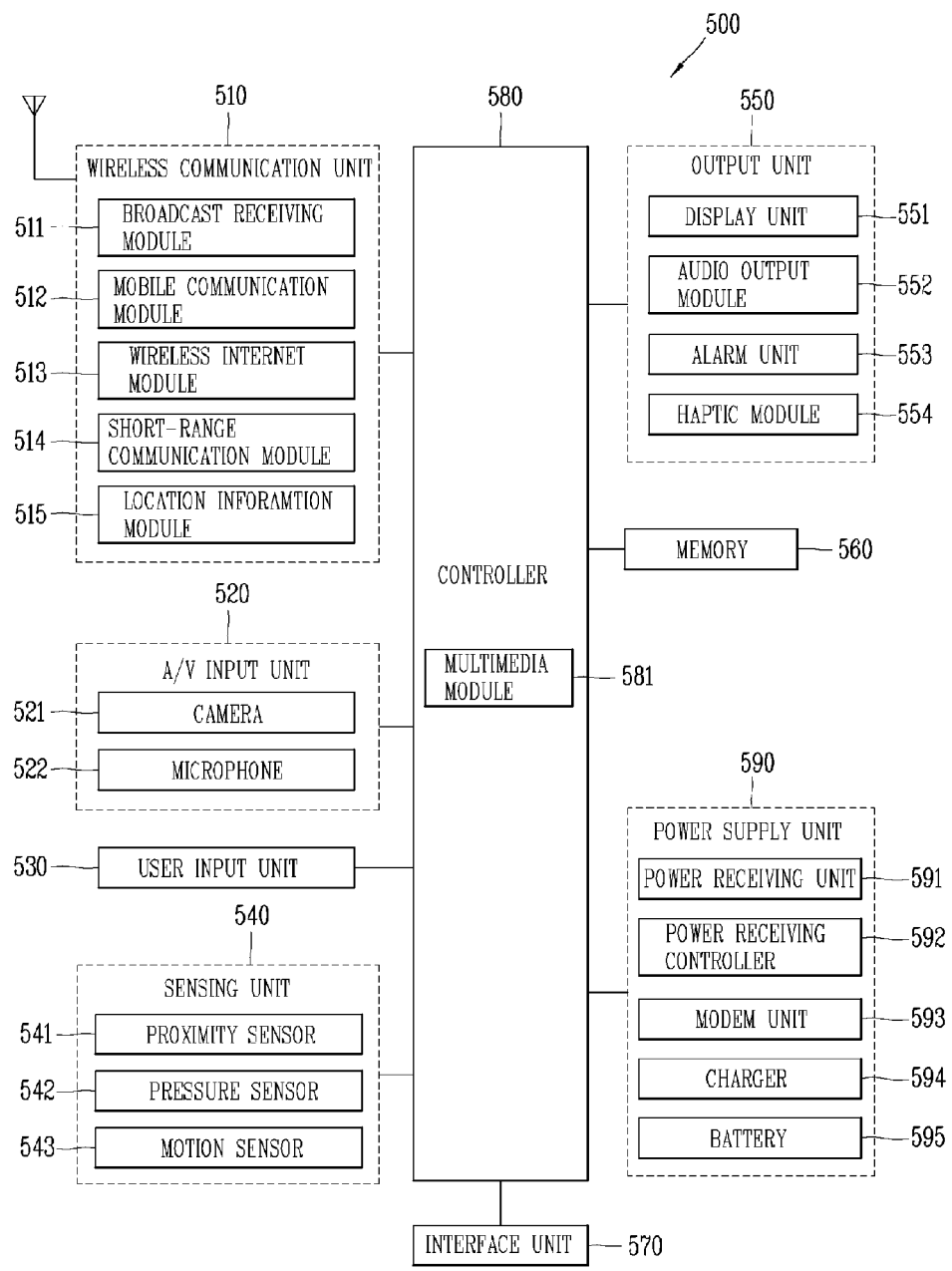

[Fig. 8]
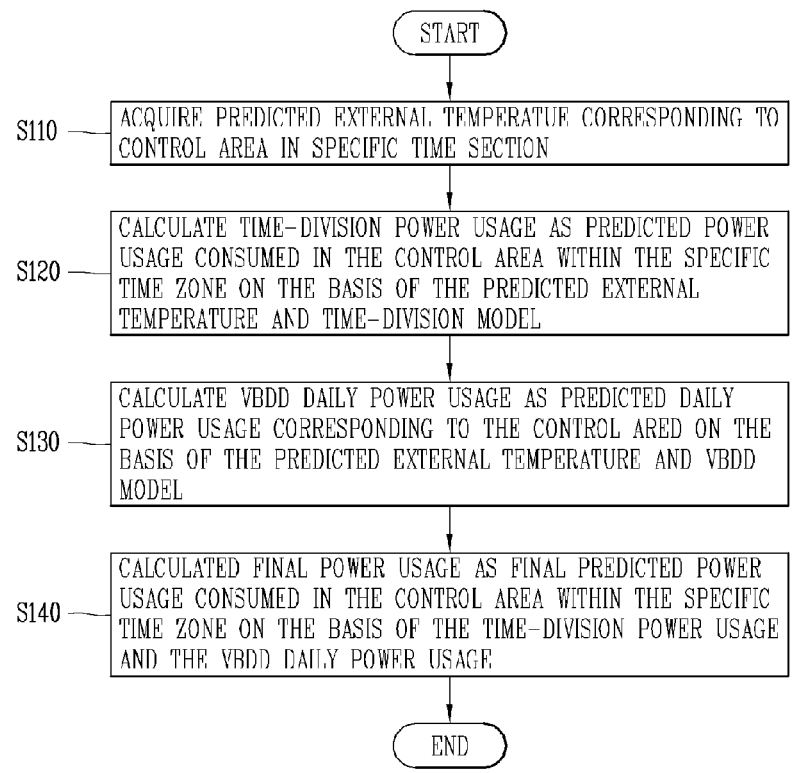

CENTRAL CONTROL APPARATUS FOR CONTROLLING FACILITIES AND FACILITY CONTROL SYSTEM HAVING THE SAME

CROSS-REFERENCE TO RELATED PATENT APPLICATIONS

This application is a. U.S. National Stage Application under 35 U.S.C. § 371 of PCT Application No. PCT/KR2015/006814, filed Jul. 2, 2015, which claims priority to Korean Patent Application No. 10-2014-0085392, filed Jul. 8, 2014, whose entire disclosures are hereby incorporated by reference.

TECHNICAL FIELD

The present disclosure relates to a central control apparatus for controlling facilities and a facility control system having the same, and more particularly, a central control apparatus for controlling at least one facility, which is installed in a control area and consumes energy, and a facility control system having the same.

BACKGROUND ART

In recent time, as building facilities become modernized, an automatic control system for automatically controlling facilities for power, lighting, air-conditioning, disaster prevention, crime prevention and the like, all installed in a building, is being expanded.

That is, development of a facility control system for integrally managing overall facilities is actively undergoing.

The facility control system is operable on the basis of one control or monitoring point, which is generally so-called a control point.

A user and the like may set many control points or a single control point with respect to one facility (equipment or device) and perform monitoring, control and the like of the facility based on a value of a corresponding control point.

An engineer may set a corresponding control point for a type and shape of each facility installed in a building, register set control point and perform an automatic control of the building.

The conventional building energy management system (BEMS) has performed management or control of a building by predicting a daily energy (power or electricity) usage based on a variable-based degree day (VBDD).

However, such method has a problem of causing difficulty and incorrectness of a time-based control due to the prediction of only the daily energy usage.

DISCLOSURE OF INVENTION

Technical Problem

Therefore, to solve the aforementioned problems, an aspect of the detailed description is to provide a central control apparatus, which is configured to calculate time-division power usage as predicted power usage, which is consumed by at least one facility in a control area within a specific time section, on the basis of predicted external temperature corresponding to the control area within the specific time section and a time-division model, calculate variable-based degree day (VBDD) daily power usage as predicted daily power usage corresponding to the control area on the basis of the predicted external temperature and a VBDD model, and calculate final power usage as final predicted power usage consumed in the control area within the specific time section on the basis of the time-division power usage and the VBDD daily power usage, and a facility control system including the same.

Solution to Problem

To achieve these and other advantages and in accordance with the purpose of the present invention, as embodied and broadly described herein, there is provided a central control apparatus for controlling at least one facility that is installed in a control area and consumes energy, the apparatus including a weather information acquiring unit that is configured to acquire predicted external temperature corresponding to the control area in a specific time section, and a controller that is configured to calculate time-division power usage as predicted power usage, which is power consumption by the at least one facility in the control area within the specific time section, on the basis of the predicted external temperature and a time-division model, calculate variable-based degree day (VBDD) daily power usage as predicted daily power usage corresponding to the control area on the basis of the predicted external temperature and a variable-based degree day (VBDD) model, and calculate final power usage as final predicted power usage, which is consumed in the control area within the specific time section, on the basis of the time-division power usage and the variable-based degree day (VBDD) daily power usage.

In accordance with one embodiment disclosed herein, the control area may be an area corresponding to a building, a store, at least one story belonging to the building, and at least one story belonging to the store.

In accordance with one embodiment disclosed herein, the central control apparatus may further include a memory that is configured to store therein external temperature and power usage for each past time section. The time-division model may be generated on the basis of a time-division power usage regression equation, which is regressively derived from the external temperature and the power usage for each past time section.

In accordance with one embodiment disclosed herein, the time division power usage regression equation may further include a basic load component.

In accordance with one embodiment disclosed herein, the basic load component may indicate basic power usage of the control area that is not subject to external temperature.

In accordance with one embodiment disclosed herein, the controller may be configured to calculate time-division daily predicted power usage by accumulating the time-division power usage, calculate a predicted daily power usage difference as a difference between the time-division daily predicted power usage and the VBDD daily power usage, and calculate the final power usage on the basis of the predicted daily power usage difference and the time-division power usage.

In accordance with one embodiment disclosed herein, the controller may be configured to calculate compensated power usage by dividing the predicted daily power usage difference by 24, and calculate the final power usage by adding the compensated power usage to the time-division power usage.

In accordance with one embodiment disclosed herein, the controller may be configured to calculate compensated power usage by multiplying the predicted daily power usage difference and a value, which is obtained by dividing the time-division power usage by the time-division daily predicted power usage, and calculate the final power usage by adding the compensated power usage to the time-division power usage.

A facility control system according to this specification to achieve the objectives and other features may include at least one facility that is installed in a control area and consumes energy, and a central control apparatus that is configured to control the at least one facility. The central control apparatus may be a central control apparatus according to the aforementioned embodiments.

A method for predicting power usage according to this specification to achieve the objectives and other features may be a method for predicting power usage for each time section, performed by a central control apparatus for controlling at least one facility which is installed in a control area and consumes energy, and the method may include acquiring predicted external temperature corresponding to the control area in a specific time section, calculating time-division power usage as predicted power usage, which is power consumption by the at least one facility in the control area within the specific time section, on the basis of the predicted external temperature and a time-division model, calculating variable-based degree day (VBDD) daily power usage as predicted daily power usage corresponding to the control area on the basis of the predicted external temperature and a VBDD model, and calculating final power usage as final predicted power usage, which is consumed in the control area within the specific time section, on the basis of the time-division power usage and the VBDD daily power usage.

In accordance with one embodiment disclosed herein, the calculating of the final power usage may include calculating time-division daily predicted power usage by accumulating the time-division power usage, calculating a predicted daily power usage difference as a difference between the time-division daily predicted power usage and the VBDD daily power usage; and calculating the final power usage on the basis of the predicted daily power usage difference and the time-division power usage.

In accordance with one embodiment disclosed herein, the calculating of the final power usage on the basis of the predicted daily power usage difference and the time-division power usage may include calculating compensated power usage by dividing the predicted daily power usage difference by 24, and calculating the final power usage by adding the compensated power usage to the time-division power usage.

In accordance with one embodiment disclosed herein, the calculating of the final power usage on the basis of the predicted daily power usage difference and the time-division power usage may include calculating compensated power usage by multiplying the predicted daily power usage difference and a value, which is obtained by dividing the time-division power usage by the time-division daily predicted power usage, and calculating the final power usage by adding the compensated power usage to the time-division power usage.

Advantageous Effects of Invention

In accordance with a central control apparatus and a facility control system for controlling facilities according to one embodiment disclosed herein, more accurate power usage prediction can be allowed in a manner of calculating time-division power usage as predicted power usage, which is a power consumption by the at least one facility in the control area within a specific time section, on the basis of predicted external temperature corresponding to the control area in the specific time section and a time-division model, calculating variable-based degree day (VBDD) daily power usage as predicted daily power usage corresponding to the control area on the basis of the predicted external temperature and a VBDD model, and calculating final power usage as final predicted power usage which his consumed in the control area within the specific time section on the basis of the time-division power usage and the VBDD daily power usage.

BRIEF DESCRIPTION OF DRAWINGS

FIG. 1 is a view illustrating a configuration of a facility control system in accordance with one embodiment of this specification.

FIG. 2 is a view illustrating a configuration of a central control apparatus for calculating power usage in accordance with one embodiment of this specification.

FIG. 3 is a view illustrating a detailed configuration of a central control apparatus in accordance with one embodiment of this specification.

FIG. 4 is an exemplary view illustrating a regression equation of a time-division power usage in accordance with one embodiment of this specification.

FIG. 5 is an exemplary view illustrating power usage prediction model in accordance with one embodiment of this specification.

FIG. 6 is an exemplary view illustrating an external terminal connected to a central control apparatus in accordance with one embodiment of this specification.

FIG. 7 is a view illustrating a configuration of a terminal connected to a central control apparatus according to this specification.

FIG. 8 is an exemplary view illustrating a method of predicting power usage in accordance with one embodiment of this specification.

MODE FOR THE INVENTION

The technology disclosed in this specification may be applied to a facility control system (or a facility management system) for controlling facilities and a central control apparatus (or a central management server) included in the facility control system.

Here, the facility control system (or the facility management system) may be a building automated system for controlling a building or facilities installed in the building. Specifically, the facility control system may be a building management system (BMS). That is, the building automated system may not limit a target to apply in an automated system, but be applicable to concepts including a factory automated system and the like. Specifically, the facility control system disclosed in this specification may be applicable to a building automated system for controlling facilities installed in a building.

Also, the facility control system may refer to a building energy management system (BEMS), which is used for managing energy associated with facilities installed within a building so as to maintain a comfortable indoor environment of the building and enhance energy efficiency.

In addition, the technology disclosed herein may be applied to an electric energy calculating method for calculating an amount of electric energy (or power usage) consumed by facilities installed within a building in order to control the facilities.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Description of Facility Control System or Facility Management System

FIG. 1 is a view illustrating a configuration of a facility control system in accordance with one embodiment of this specification.

Referring to FIG. 1, a facility control system 10 in accordance with one exemplary embodiment of the present invention may include a central management server 100, a facility control apparatus 200, 200' connected to the central management server 100 through a communication network, one or more facilities 300, 300' and one or more equipment 400, 400'.

As illustrated in FIG. 1, the facility control system according to the one exemplary embodiment disclosed herein may include one or more facilities 300, 300', and a central control apparatus (or a central management server) 100 that is configured to register one or more control points for the one or more facilities 300, 300' and manage the one or more facilities 300, 300' using the control point.

Here, the central control apparatus 100 may include one or more stations (or 'virtual servers'), which are generated by registering at least some of the control points. Each station may control facilities with respect to the some control points, registered according to a control command input through a user input.

The facilities 300, 300' are sub systems constructing the facility control system 10, and may refer to, for example, an air conditioner, ventilator, a fan, a boiler, a cooling tower, a pump, a temperature/humidity sensor, a cooler, a lighting equipment, a power supply, a fire alarm system and the like.

The equipment 400, 400' may refer to a cooling tower, a pump, a temperature sensor and the like, for example, when a cooling tower system is a facility.

The central control apparatus 100 is an apparatus which generally controls and/or monitors an overall condition of a building (or a site). The central control apparatus 100 may include separate terminals for managing the facilities 300, 300', for example, machinery, lighting, electricity, access control, disaster prevention, parking management, facility management, and the like.

The central control apparatus 100 may be an automation server which shares information with the facility control apparatus 100 through network communication, and controls or monitors the facilities 300, 300' and the included equipment 400, 400' through the control points.

The central control apparatus 100 may generally register one or more preset control points in the facilities 300, 300' or the equipment 400, 400', and generate a management program of driving the facilities 300, 300' or the equipment 400, 400' based on the control points.

The central control apparatus 100 may control and/or monitor the facilities 300, 300' using the management program.

In accordance with one embodiment of the present invention, the central control apparatus 100 may output a control screen for facilities installed in a control area.

The central control apparatus 100 may receive a user input through the control screen, and provide a user interface or an input/output screen for outputting a control processing process or a control result for a facility performed in response to the user input.

In detail, the central control apparatus 100 may output a time line, which a control time for the facility is sequentially output according to a lapse of time, on a first area of the control screen. The central control apparatus 100 may provide on a second area of the control screen the control screen or a user interface corresponding to the control screen, by outputting status information relating to the facility, which corresponds to a control time on the time line.

The control area may refer to a control point of interest (control POI) or a target area to be controlled, which belongs to a building (or a site). For example, the control area may be an area corresponding to at least one story or floor (or an arbitrary story or floor) within a building to be controlled.

Here, the building (or the site) which is a target building to be controlled may refer to a shopping center, a convenience store, a shop, a house, an office, an officetel, a factory, an educational institution, a hospital and the like.

The facility control apparatus 200 may be located between the central control apparatus 100 and the one or more facilities 300, 300', and execute the management program received from the central control apparatus 100.

That is, the facility control apparatus 200 may be a direct digital controller or a programmable logic controller (PLC) which controls the facilities 300, 300'.

The facility control apparatus 200 may control the facilities 300, 300' in a manner of exchanging information with the central control server 100 through communication, and receiving and executing the management program or a control command according to the management program.

The facility control apparatus 200 may also record or store facility-related information, such as a control output, state variation and the like relating to the facilities within a building on the basis of the control points set in the one or more equipment 400, 400', for example, each sensor and handling devices, provided in the facilities 300, 300'.

The facility control apparatus 200, for example, may be a microcomputer which controls or monitors the facilities 300, 300' or the equipment 400, 400' according to the management program. In other words, the facility control apparatus 200 is connected to the central control apparatus 100 through a communication network so as to transmit and receive necessary information. Accordingly, the facility control apparatus 200 can monitor or control each control point set to an air conditioning facility and other facilities within a building, and directly control an input/output signal of the facilities 300, 300' or the equipment 400, 400' using a function provided in each control point.

In detail, the facility control apparatus 200 may be located between the central control apparatus 100 and the one or more facilities 300, 300' and configured to receive a management program or a control command according to the management program and execute the management program or the control command.

The facility control apparatus 200 may transmit the execution result to the central control apparatus 100. To this end, the central control apparatus 100 may include a communication unit that is configured to transmit the management program or the control command according to the management program to the facility control apparatus 200, and receive an execution result according to the management program or the control command according to the management program from the facility control apparatus 200.

The central control apparatus 100 may further include a display unit as the means for outputting the execution result on a user screen.

The central control apparatus 100, the facility control apparatus 200 and each facility 300, 300' may be connected together through a communication network.

In accordance with one embodiment of the present invention, the communication network may include various communication protocols.

For example, the central control apparatus 100, the facility control apparatus 200 and each facility 300, 300' may be connected together through transmission control protocol/internet protocol (TCP/IP) or building automation & control network (BACnet).

Also, examples of the communication protocol may include CAN, DeviceNet, Profibus, Interbus, LonWorks and the like. Among others, the LonWorks may use all OSI 7-layers so as to ease the access to an Internet, which enables the monitoring and control through the Internet. Thus, the LonWorks is applied in various manners and obtains increasing importance.

Description of Central Control Apparatus According to One Embodiment

A central control apparatus according to one embodiment of the present invention is an apparatus for controlling at least one facility which is installed in a control area and consumes electric energy (or power). The central control apparatus may include a weather information acquiring unit that is configured to acquire predicted external temperature corresponding to the control area within a specific time section (or a time zone, a length of time, etc), and a controller that is configured to calculate time-division power usage (or power consumption) as predicted power usage, which is a power consumption by the at least one facility in the control area within the specific time section, on the basis of the predicted external temperature and a time-division model, calculate variable-based degree day (VBDD) daily power usage as predicted daily power usage corresponding to the control area on the basis of the predicted external temperature and a VBDD model, and calculate final power usage as final predicted power usage consumed in the control area within the specific time section on the basis of the time-division power usage and the VBDD daily power usage.

In accordance with one embodiment, the control area may be an area corresponding to a building, a store, at least one story belonging to the building, and at least one story belonging to the store.

Also, the central control apparatus according to one embodiment may further include a memory (or a storage unit) that is configured to store external temperature and power usage for each past time section.

Here, the time-division model may be generated on the basis of a time-division power usage regression equation, which is regressively derived from the external temperature and the power usage for each past time section.

In accordance with one embodiment, the time-division power usage regression equation may further include a basic load component.

In accordance with one embodiment, the basic load component may indicate a basic power usage of the control area which is not subject to external temperature.

In accordance with one embodiment, the controller may calculate a time-division daily predicted power usage by accumulating the time-division power usage, calculate a predicted daily power usage difference which is a difference between the time-division daily predicted power usage and the VBDD daily power usage, and calculate the final power usage on the basis of the predicted daily power usage difference and the time-division power usage.

In accordance with one embodiment, the controller may calculate compensated (or adjusted) power usage by dividing the predicted daily power usage difference by 24, and calculate the final power usage by adding the compensated power usage to the time-division power usage.

In accordance with one embodiment, the controller may calculate compensated power usage by multiplying the predicted daily power usage difference and a value, which is obtained by dividing the time-division power usage by the time-division daily predicted power usage, and calculate the final power usage by adding the compensated power usage to the time-division power usage.

FIG. 2 is a view illustrating a configuration of a central control apparatus for calculating power usage in accordance with one embodiment of this specification.

Referring to FIG. 2, a central control apparatus 100 which calculates power usage in accordance with one embodiment of the present invention may include a controller 140 and a weather information acquiring unit 160.

It is understood that implementing all of the illustrated components illustrated in FIG. 2 is not a requirement, and that the central control apparatus 100 having greater or fewer components may alternatively be implemented.

Hereinafter, each component will be described in sequence.

The weather information acquiring unit 160 may acquire predicted external temperature corresponding to a control area, in which at least one facility consuming electric energy (or power) is installed, within a specific time section.

Here, the control area may be an area corresponding to a building, a store, at least one story (or floor) belonging to the building, and at least one story belonging to the store.

In accordance with one embodiment, the weather information acquiring unit 160 may acquire the predicted external temperature from a Meteorological Administration (MA) server W100.

Therefore, the weather information acquiring unit 160 may be configured as a type of communication module which is accessible to the MA server W100 for acquiring the predicted external weather.

The controller 140 may calculate time-division power usage as predicted power usage, which is power consumption by the at least one facility in the control area within the specific time section, on the basis of the predicted external temperature and a time-division model.

The time-division model as a time-based prediction model is obtained by deriving 24 regression equations in a manner of applying the following equation on the time section basis.

$$\text{Elec\_Hour}(h) = \text{OutTemp}(h) * Cl + \text{Baseload}$$

Here, Elec_Hour(h) may denote cumulative power usage within a time section h, OutTemp(h) may denote average external temperature in the time section h, and Baseload may denote basic usage which is not subject to the external temperature.

The time-division model is a model to which a linear correlation between external temperature and power usage within a corresponding time section is reflected. Sampling data used for deriving a time section-based regression coefficient is limited to data of the corresponding time section in the past, and the power usage can be predicted by using weather forecast information relating to a predicted date, which is provided from the MA.

Here, the Baseload may be standby power for an air conditioner in a deactivated state of an air-conditioning function when the at least one facility is the air conditioner.

Also, the controller 140 may calculate VBDD daily power usage which is predicted daily power usage corresponding to the control area on the basis of the predicted external temperature and a VBDD model.

The controller 140 may calculate final power usage as final predicted power usage, which is consumed in the control area within the specific time section, on the basis of the time-division power usage and the VBDD daily power usage.

Here, the final power usage may refer to a rate value of a time-based power usage.

In accordance with one embodiment, the central control apparatus 100 may further include a memory (corresponding to the memory 150 of FIG. 3) in which the external temperature and power usage for each past time section are stored.

In this instance, the time-division model may be generated based on a time-division power usage regression equation which is regressively derived from the external temperature and power usage for each past time section (or the rate value of the power usage).

In accordance with one embodiment, the time-division power usage regression equation may further include a basic load component.

Here, the basic load component may refer to basic power usage of the control area which is not subject to the external temperature.

In accordance with one embodiment, the controller 140 may also calculate time-division daily predicted power usage by accumulating the time-division power usage, calculate a predicted daily power usage difference, which is a difference between the time-division daily predicted power usage and the VBDD daily power usage, and calculate the final power usage on the basis of the predicted daily power usage difference and the time-division power usage.

In detail, the controller 140 may calculate compensated (or adjusted) power usage by dividing the predicted daily power usage difference by 24 in case of a uniform compensation (or a uniform adjustment), and calculate the final power usage by adding the compensated power usage to the time-division power usage.

In this instance, the final power usage may be expressed by the following equation.

$$\text{Elec\_Hour\_final}(h) = \text{Elec\_Hour}(h) + \text{Diff\_VBD\_D\_Hourly}(\text{Day})/24$$

Here, Elec_Hour_final(h) may denote the final power usage (a time-based power usage rate value) within a time section h, Elec_Hour(h) may denote the time-division power usage within the time section h, and Diff_VBDD_Hourly (Day) may denote a difference between the time division daily predicted power usage and the VBDD daily power usage.

In accordance with another embodiment, the controller 140 may calculate compensated power usage by multiplying the predicted daily power usage difference and a value, which is obtained by dividing the time-division power usage by the time-division daily predicted power usage, in case of a non-uniform compensation (or a non-uniform adjustment), and calculate the final power usage by adding the compensated power usage to the time-division power usage.

In this instance, the final power usage may be expressed by the following equation.

$$\text{Elec\_Hour\_final}(h) = \text{Elec\_Hour}(h) + \text{Diff\_VBD\_D\_Hourly}(\text{Day}) * (\text{Elec\_Hour}(h)/\text{Elec\_Sum\_Hourly}(\text{Day}))$$

Here, Elec_Hour_final(h) may denote the final power usage (a time-based power usage rate value) within a time section h. Elec_Hour(h) may denote the time-division power usage within the time section h. Diff_VBDD_Hourly(Day) may denote a difference between the time-division daily predicted power usage and the VBDD daily power usage. Elec_Sum_Hourly(Day) may denote the time-division daily predicted power usage.

FIG. 3 is a view illustrating a detailed configuration of a central control apparatus in accordance with one embodiment of this specification.

Referring to FIG. 3, a central control apparatus 100 in accordance with one embodiment of the present invention may include a communication unit 130 and a controller 140.

In accordance with the one embodiment disclosed herein, the central control apparatus 100 may further include at least one of a memory 150, a display unit 120, and an input unit 110.

In addition to these, the central control apparatus 100 may further include various components for detecting electric energy (power, electricity) usage according to the one embodiment disclosed herein.

It is understood that implementing all of the illustrated components illustrated in FIG. 3 is not a requirement, and that the central control apparatus 100 having greater or fewer components may alternatively be implemented.

Hereinafter, each component will be described in sequence.

The communication unit 130 may transmit a control command, a management program or an execution result of the management program to the facility control apparatus 200. Accordingly, the facility control apparatus 200 may control a facility to control.

Also, the communication unit 130 may receive a control result of the facility and information relating to a control processing process from the facility control apparatus 200.

The communication unit 130 may receive various types of information (e.g., status information) relating to facilities from a plurality of control points.

The central control apparatus 100 may be connected to an external terminal through the communication unit 130. A user of the central control apparatus 100 may execute a function (e.g., management or control function for facilities), which is performed by the central control apparatus 100, through the external terminal.

In accordance with one embodiment, the communication unit 130 may play a role of the aforementioned weather information acquiring unit 160.

Therefore, the communication unit 130 may acquire predicted external temperature corresponding to the control area within a specific time section from the MA server W100.

The communication unit 130 may perform wired or wireless data communication with the external terminal. The communication unit 130 may include an electronic component for at least one of Bluetooth™, Zigbee, ultra wide band (UWB), wireless USB, near field communication (NFC), wireless LAN or a mobile communication network.

The controller 130 may function to control those components included in the central control apparatus 100 in order to provide a function of calculating a power usage rate value in accordance with one embodiment disclosed herein.

In accordance with one embodiment, the controller 140 may simultaneously control at least two selected facilities on the basis of a user control input applied through the input unit 110.

The technology disclosed in this specification may not control the control area, which is divided into preset facility groups or a plurality of zones, merely on the zone basis. The technology disclosed herein may rather selectively control all the devices or equipment, which are currently operating in a variation pattern of status information corresponding to a specific equipment or facility. This may thus provide advantages of optimizing a facility operation environment, and efficiently managing facilities and equipment.

In accordance with one embodiment, the controller 140 may control facilities installed in the specific area through the facility control apparatus 200, which performs communication with the central control apparatus 100 by a specific communication method.

Here, the specific communication method may be at least one of transmission control protocol/internet protocol (TCP/IP), building automation & control network (BACnet), and LonWorks.

The facility control apparatus 200 may also be at least one of a direct digital controller or a programmable logic controller (PLC).

A detailed operation of the controller 140 in association with the power usage prediction function is the same as the aforementioned, and thus detailed description thereof will be omitted.

The display unit 120 may be configured to output a control screen for facilities installed in a control area, and various graphic objects associated with the control screen.

Here, the control area may be an area corresponding to at least one story belonging to a building to be controlled.

The display unit 120 outputs information processed in the central control apparatus 100. For example, the display unit 110 may output user interface (UI) or a graphic user interface (GUI) which relates to a function provided by the central control apparatus 100.

In accordance with one embodiment, the display unit 120 may output a calculation result of a power usage rate value and a calculating process thereof on the control screen.

The display unit 120 may include at least one of a liquid crystal display (LCD), thin film transistor-liquid crystal display (TFT-LCD), organic light-emitting diode (OLED), a flexible display and a three-dimensional (3D) display.

Two or more display units 120 may be present according to the implemented configuration of the central control apparatus 100. For example, the central control apparatus 100 may be simultaneously include an external display unit (not illustrated) and an internal display unit (not illustrated).

If the display unit 120 and a touch sensitive sensor (referred to as a 'touch sensor') have a layered structure therebetween (referred to as a 'touch screen'), the display unit 120 may be used as an input device as well as an output device. The touch sensor may be implemented as a touch film, a touch sheet, a touchpad, and the like.

In accordance with another embodiment, the control screen may be output through a display device (not illustrated) connected to the central control apparatus 100.

The input unit 110 may be configured to receive a user input applied for controlling the central control apparatus 100.

The input unit 110 may generate input data for the user to control an operation of the central control apparatus 100.

The input unit 110 may be implemented as a key pad, a dome switch, a touch pad (e.g., static pressure/capacitance), a jog wheel, a jog switch and the like. Specifically, when the touchpad is interlayered with the display unit 120, it may be called a touch screen.

In accordance with one embodiment, the input unit 110 may receive various user inputs from the user.

For example, the input unit 110 may receive a user input for activating the function of calculating electric energy (power) usage for the control area.

As another example, the input nit 110 may receive a user set input. In this instance, the controller 140 may set a control parameter for the facility corresponding to the specific control time on the basis of the user set input.

The input unit 110 may receive a control input for controlling facilities installed in a control POI to be controlled or a control area to be targeted.

In accordance with one embodiment, the input unit 110 may receive a user input through a UI provided to the user from the central control apparatus 100. Specifically, the UI may be a graphic UI (GUI).

For example, the input unit 110 may receive the control input through a graphic object which indicates (or represents) a facility to be controlled on the control screen.

In detail, when the user clicks or touches the graphic object on the control screen, the UI may output an input window or the like (e.g., a popup menu) on the screen in response to the click or touch, and the user can apply the control input through the input window or the like.

Here, the graphic object may be an icon or indicator indicating the facility.

In accordance with one embodiment, the graphic object may be output on the screen in a shape or size set to correspond to an actual shape or size of the facility.

For example, when the facility is in a rectangular shape, the graphic object may also be in the same rectangular shape. Also, the size of the graphic object may be a reduced size of the facility by a predetermined ratio.

For example, the input unit 110 may receive the control input applied through the aforementioned linear indicator.

In detail, when the user clicks or touches the linear indicator output on the control screen, the user interface may output an input window and the like (e.g., a popup menu) on the screen in response to the click or touch. The user may thus apply the control input through the input window and the like.

The memory 150 may store therein the power usage calculation result and its processing process by the controller 140.

Also, the memory 150 may store therein a program for processing and control of the controller 140, and also perform a function of temporarily storing input/output data, the user input, a control input, a set input and the like.

In accordance with one embodiment, the memory 150 may store external temperature and power usage for each past time section.

In this instance, the time-division model may be generated on the basis of a regression equation of time-division power usage, which is regressively derived from the external temperature and the power usage for each past time section.

The memory 150 may include at least one type of storage medium including a flash memory type, a hard disk type, a solid state disk or solid state drive (SSD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

Also, the central control apparatus 100 may be operated in relation to a web storage device that performs the storage function of the memory 150 over the Internet.

A facility control system in accordance with one embodiment disclosed herein may include at least one facility that is installed in a control area and consumes energy, and a central control apparatus that is configured to control the at least one facility. The central control apparatus may be a central control apparatus according to the aforementioned embodiments.

Detailed Embodiment of Power Usage Prediction Method

Detailed embodiment disclosed hereinafter will be implemented by a part or combination of configurations or steps included in the aforementioned embodiments or a combination of the embodiments, and redundant portions will be omitted to clearly describe the detailed embodiment.

FIG. 4 is an exemplary view illustrating a regression equation of time-division power usage in accordance with one embodiment of this specification.

Referring to FIG. 4, the central control apparatus 100 according to the one embodiment may generate the time-division model on the basis of a time-division power usage regression equation (EQ10), which is regressively derived from the external temperature and the power usage for each past time section.

As aforementioned, the time-division power usage regression equation EQ10 may be expressed by the following equation.

$$\text{Elec\_Hour}(h) = \text{OutTemp}(h) * Cl + \text{Baseload}$$

Here, Elec_Hour(h) may denote cumulative power usage within a time section h, OutTemp(h) may denote average external temperature within the time section h, and Baseload may denote basic usage which is not subject to the external temperature.

FIG. 5 is an exemplary view illustrating power usage prediction model in accordance with one embodiment of this specification.

Referring to FIG. 5, the central control apparatus 100 may acquire predicted external temperature corresponding to the control area within a specific time section.

Also, the central control apparatus 100 may calculate energy (or power) usage (daily, the aforementioned VBDD daily power usage) on the basis of the predicted external temperature and a VBDD model as a statistical model. Using a statistical model (VBDD)

The central control apparatus 100 may also calculate energy usage (time, the aforementioned time-division power usage) by the at least one facility on the basis of the predicted external temperature and the time-division model.—Using a time-division model The central control apparatus 100 may also calculate final energy usage (time, the aforementioned final power usage), which is consumed in the control area within the specific time section, on the basis of the time-division power usage and the VBDD daily power usage.—Using a hybrid VBDD time-division model Central Control Apparatus Controlled by External Terminal Hereinafter, description will be given of an external terminal connected to a facility control system (in detail, an external terminal connected to the central control apparatus 100) in accordance with one embodiment, with reference to FIGS. 6 and 7.

A method for controlling a central control apparatus through a terminal in accordance with one embodiment disclosed hereinafter will be implemented by a part or combination of configurations or steps included in the aforementioned embodiments or a combination of the embodiments, and redundant portions will be omitted to clearly describe a management of facilities through a terminal and a control method thereof according to one embodiment.

A mobile terminal 500 according to one embodiment may be connected to the central control apparatus 100 so as to control the central control apparatus 100.

That is, a user or a facility manager may perform power usage predicting function according to the aforementioned embodiments in a manner of accessing the central control apparatus 100 through the mobile terminal 500.

FIG. 6 is an exemplary view illustrating an external terminal connected to a central control apparatus in accordance with one embodiment of this specification.

Referring to FIG. 6, a central control apparatus 100 according to one variation disclosed herein may be connected to a terminal (or an external terminal) 500 in a wired or wireless manner.

In accordance with one embodiment, a controller 140 (see FIG. 3) of the central control apparatus 100 may transmit the control screen to the terminal 500. To this end, the central control apparatus 100 may be connected to the terminal 500 through the communication unit 150.

In this instance, the user may apply a user input according to the aforementioned embodiments through the control screen output by the terminal 500.

The terminal 500 may then transmit the applied user input to the central control apparatus 100 and receive and output a control screen which has been controlled or changed according to the aforementioned embodiments.

FIG. 7 is a view illustrating a configuration of a terminal connected to a central control apparatus according to this specification.

FIG. 7 illustrates a configuration in case where the terminal 500 according to the embodiments disclosed herein is implemented as a type of a mobile terminal.

The terminal 500 may further include a wireless communication unit 510, an audio/video (A/V) input unit 520, a user input unit 530, a sensing unit 540, an output unit 550, a memory 560, an interface unit 570, and a controller 580. It is understood that implementing all of the components illustrated in FIG. 9 is not a requirement, and that greater or fewer components may alternatively be implemented.

Hereinafter, each component will be described in sequence.

The wireless communication unit 510 typically includes one or more modules which permit wireless communications between the terminal 500 and a wireless communication system, communications between the terminal 500 and another terminal 500, or communications between the terminal 500 and the central control apparatus 100.

For example, the wireless communication unit 510 may include a broadcast receiving module 511, a mobile communication module 512, a wireless Internet module 513, a short-range communication module 514, a location information module 515, and the like.

The broadcast receiving module 511 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 512.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 511 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 511 may be configured to be suitable for every broadcast system transmitting broadcast signals as well as the digital broadcasting systems.

Broadcast signals and/or broadcast associated information received via the broadcast receiving module 511 may be stored in a suitable device, such as a memory 560.

The mobile communication module 512 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 513 supports wireless Internet access for the mobile terminal. This module may be internally or externally coupled to the terminal 500. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 514 denotes a module for short-range communications. Suitable technologies for implementing this module may include Bluetooth™, Radio Frequency IDentification (RFID), Infrared Data Association (IrDA), Ultra-WideBand (UWB), ZigBee™, and the like. Meanwhile, examples of wired short-range communications may include universal serial bus (USB), IEEE 1394, Thunderbolt™, and the like.

The wireless Internet module 513 or the short-range communication module 514 may establish a data communication connection with the central control apparatus 100.

While transferring power in a wireless manner, when the wireless Internet module 513 or the short-range communication module 514 has an audio signal to output, the wireless Internet module 513 or the short-range communication module 514 may transmit the audio signal to the central control apparatus 100 through the short-range communication module by using the established data communication. Also, when the wireless Internet module 513 or the short-range communication module 514 has information to output, the wireless Internet module 513 or the short-range communication module 514 may transmit the information to the central control apparatus 100 through the established data communication. Or, the wireless Internet module 513 or the short-range communication module 514 may receive an audio signal input through a microphone provided in the central control apparatus 100 through the established data communication. The wireless Internet module 513 or the short-range communication module 514 may also transmit identification information relating to the mobile terminal 500 (e.g., a phone number or a device name in case of a mobile phone) to the central control apparatus 100 through the established data communication.

The location information module 515 denotes a module for detecting or calculating a position of a mobile terminal. An example of the location information module 115 may include a Global Position System (GPS) module.

Referring to FIG. 7, the A/V input unit 520 is configured to provide audio or video signal. The A/V input unit 520 may include a camera 521 and a microphone 522. The camera 521 receives and processes image frames of still pictures or video obtained by image sensors in a video call mode or a capturing mode. The processed image frames may be displayed on a display unit 551.

The image frames processed by the camera 521 may be stored in the memory 560 or transmitted to the exterior via the wireless communication unit 510. Two or more cameras 521 may be provided according to the configuration of the terminal.

The microphone 522 may receive an external audio signal through the microphone while the mobile terminal is in a particular mode, such as a phone call mode, a recording mode, a voice recognition mode, or the like. This audio signal is processed into electrical audio data. The processed electrical audio data is converted for output into a format transmittable to a mobile communication base station via the mobile communication module 512 in case of the phone call mode. The microphone 522 may include assorted noise removing algorithms to remove noise generated in the course of receiving the external audio signal.

The user input unit 530 may generate input data input by a user to control the operation of the mobile terminal. The user input unit 530 may include a keypad, a dome switch, a touchpad (e.g., static pressure/capacitance), a jog wheel, a jog switch and the like.

The sensing unit 540 may include a proximity sensor 541, a pressure sensor 542, a motion sensor 543 and the like. The proximity sensor 541 may sense an object approaching the mobile terminal 500 or the presence or absence of an object existing near the mobile terminal 500, or the like, without a physical contact. The proximity sensor 541 may detect a proximity object by using a change in an AC magnetic field or a change in a static magnetic field, or by using a variation of capacitance, or the like. Two or more proximity sensors 541 may be provided according to specifications.

The pressure sensor 542 can detect whether or not pressure is applied to the mobile terminal 500, the size of the pressure, or the like. The pressure sensor 542 may be installed at a portion of the mobile terminal 500 where pressure needs to be detected according to a usage environment. When the pressure sensor 542 is installed on the display unit 551, a touch input through the display unit 551 and a pressure touch input to which greater pressure than the touch input is applied can be identified according to a signal output from the pressure sensor 542. Also, when a pressure touch is input, the size of the pressure applied to the display unit 551 can be recognized according to a signal output from the pressure sensor 542.

The motion sensor 543 detects the location or a movement of the mobile terminal 500 by using an acceleration sensor, a gyro sensor, or the like. An acceleration sensor which can be used for the motion sensor 543 is an element for changing a change in acceleration in one direction into an electrical signal. The acceleration sensor is configured by mounting a 2-axis acceleration sensor or a 3-axis acceleration sensor on a single package, and only a single axis, i.e., Z axis, may be required according to usage environments. Thus, when an X-axis or Y-axis directional acceleration sensor is to be used, instead of the Z-axis directional acceleration sensor for some reasons, the acceleration sensor may be mounted to be stood on a main substrate by using a piece substrate. The gyro sensor refers to a sensor of measuring an angular speed of the mobile terminal 500 which performs a rotation motion and can sense an angle rotated from a reference direction. For example, the gyro sensor may sense each rotated angle on the basis of axes of three directions, namely, sense azimuth, pitch and roll.

The output unit 550 may be configured to output various types of information, such as audio, video, tactile output, and the like. The output unit 550 may be shown having a display unit 551, an audio output module 552, an alarm unit 553, a haptic module 554, and the like.

The display unit 551 outputs information processed in the terminal 500. For example, when the terminal is in a call mode, the display unit 551 outputs a UI or GUI associated with the call. When the terminal 500 is in the telephony call mode or a capture mode, the display unit 551 outputs a captured and/or received image or UI or GUI.

The display unit 551 may include at least one of a liquid crystal display (LCD), a thin film transistor-liquid crystal display (TFT-LCD), an organic light emitting diode (OLED), a flexible display and a 3-dimensional (3D) display.

Among others, some of displays may be configured to be transparent or light-transmissive such that the outside can be viewed therethrough. This may be referred to as a transparent display. An example of the transparent display may be a transparent OLED (TOLED) and the like, which may be configured into a rear structure or a light-transmissive structure of the display unit 551. With this structure, the user can view an object located at the rear of the terminal body through a region occupied by the display unit 551 of the terminal body.

The display unit 551 may be implemented using two display devices, according to the configuration of the terminal 500. For instance, a plurality of the display units may be arranged on one side of the terminal 500, either spaced apart from each other, or these devices may be integrated, or these devices may be arranged on different surfaces.

The display unit 551 and a sensor sensing a touch operation (hereinafter, referred to as 'touch sensor') are interlayered with each other (hereinafter, referred to as 'touch screen'), the display unit 551 may also be used as an input device as well as an output device. The touch sensor may have a form of a touch film, a touch sheet, a touchpad and the like.

The touch sensor may be configured to convert changes of pressure applied to a specific part of the display unit 551, or convert capacitance occurring at a specific part of the display unit 551, into electric input signals. The touch sensor may also be configured to sense not only a touched position and a touched area, but also touch pressure and/or touch capacitance.

When touch inputs are sensed by the touch sensors, corresponding signals are transmitted to a touch controller. The touch controller processes the received signals, and then transmits corresponding data to the controller 580. Accordingly, the controller 580 may sense which region of the display unit 551 has been touched.

The proximity sensor 541 may be disposed in an inner region of the terminal surrounded by the touch screen or near the touch screen. The proximity sensor 541 is a sensor for detecting the presence or absence of an object relative to a certain detection surface or an object that exists nearby by using the force of electromagnetism or infrared rays without a physical contact. Thus, the proximity sensor 541 has a considerably longer life span compared with a contact type sensor, and it can be utilized for various purposes.

Examples of the proximity sensor 541 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

Hereinafter, for the sake of brief explanation, a status that the pointer is positioned to be proximate onto the touch screen without contact will be referred to as 'proximity touch' whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 541 senses proximity touch, and proximity touch patterns (e.g., distance, direction, speed, time, position, moving status, etc.). Information relating to the sensed proximity touch and the sensed proximity touch patterns may be output onto the touch screen.

The audio output module 552 is generally configured to output audio data. Such audio data may be received from the wireless communication unit 510 or may have been stored in the memory 560. The audio data may be output during modes such as a signal reception mode, a call mode, a record mode, a voice recognition mode, a broadcast reception mode, and the like. The audio output module 552 can provide audible output related to a particular function (e.g., a call signal reception sound, a message reception sound, etc.) performed by the terminal 500. The audio output module 552 may also be implemented as a receiver, a speaker, a buzzer, or the like.

The alarm unit 553 outputs a signal for informing about an occurrence of an event of the terminal 500. Events generated in the mobile terminal may include call signal reception, message reception, key signal inputs, a touch input etc. In addition to video or audio signals, the alarm unit 554 may output signals in a different manner, for example, using vibration to inform about an occurrence of an event. The video or audio signals may be also outputted via the audio output module 552, so the display unit 551 and the audio output module 552 may be classified as parts of the alarm unit 553.

A haptic module 554 can be configured to generate various tactile effects that a user feels, perceive, or otherwise experience. A typical example of a tactile effect generated by the haptic module 554 is vibration. The strength, pattern and the like of the vibration generated by the haptic module 554 can be controlled by user selection or setting by the controller. For example, the haptic module 554 may output different vibrations in a combining manner or a sequential manner.

Besides vibration, the haptic module 554 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 554 may be implemented to allow the user to feel a tactile effect through a muscle sensation such as fingers or arm of the user, as well as transferring the tactile effect through a direct contact. Two or more haptic modules 554 may be provided according to the configuration of the terminal 500.

The memory 560 may store software programs used for operations performed by the controller 580, or may temporarily store data (e.g., a phonebook, messages, still images, video, etc.) that are inputted or outputted. Also, the memory 560 may store data regarding various patterns of vibrations and audio signals outputted when a touch is inputted to the touch screen.

Also, the memory 560 may store a program (e.g., a management program) associated with control and management of facilities. The program may be executed by the controller 580.

Also, the memory 560 may store an application which have been downloaded from an application providing server (e.g., a web store) to control or manage facilities.

The memory 560 may include one or more types of storage mediums including a flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The terminal 500 may also be operated in relation to a network storage device that performs the storage function of the memory 560 over a network, such as the Internet.

The interface unit 570 serves as an interface for external devices to be connected with the terminal 500. For example, the interface unit 570 can receive data transmitted from an external device, receive power to transfer to elements and components within the terminal 500, or transmit internal data of the terminal 500 to such external device. The interface unit 570 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 500 and may include a user identity module (UIM), a subscriber identity module (SIM), a universal subscriber identity module (USIM), and the like. In addition, the device having the identification module (also referred to herein as an 'identifying device') may take the form of a smart card. Accordingly, the identifying device can be connected with the terminal 500 via a port.

When the terminal 500 is connected with an external cradle, the interface unit can serve as a passage to allow power from the cradle to be supplied to the terminal 500 or may serve as a passage to allow various command signals input by the user from the cradle to be transferred to the terminal therethrough. Various command signals or power input from the cradle may operate as signals for recognizing that the mobile terminal is properly mounted on the cradle.

The controller 580 typically controls the general operations of the terminal. For example, the controller 580 performs controlling and processing associated with voice calls, data communications, video calls, and the like. The controller 580 may include a multimedia module 581 for reproducing multimedia data. The multimedia module 581 may be configured within the controller 580 or may be configured to be separated from the controller 580.

The controller 580 may perform pattern recognition processing to recognize a handwriting input or a picture drawing input performed on the touch screen as characters or images, respectively.

The power supply unit 590 receives external power or provide internal power and supply the appropriate power required for operating respective elements and components included in the terminal 500.

The power supply unit 590 may include a battery supplying power each component of the terminal 500, and further include a charger 598 charging the battery 599 in a wired or wireless manner.

This specification exemplarily illustrates a mobile terminal connected to the central control apparatus 100, but it may be easily understood by those skilled in the art that the configuration according to the exemplary embodiments of this specification can be applied to stationary terminals such as digital TV, desktop computers and the like excluding a case of being applicable only to the mobile terminals.

Also, a facility control system in accordance with on embodiment disclosed herein may include at least one facility, a facility control apparatus connected to the at least one facility in a wired or wireless manner, and a central control apparatus controlling the at least one facility through the facility control apparatus. Here, the central control apparatus may be connected to a mobile terminal through wired or wireless communication so as to be remotely controlled. The mobile terminal may be a mobile terminal according to the aforementioned embodiment.

Method of Predicting Power Usage According to One Embodiment

A method for predicting power usage in accordance with one embodiment disclosed herein is a method for predicting power usage for each time section, performed by a central control apparatus for controlling at least one facility which is installed in a control area and consumes energy (electricity), and may include acquiring predicted external temperature corresponding to the control area in a specific time section, calculating time-division power usage as predicted power usage, which is power consumption by the at least one facility in the control area within the specific time section, on the basis of the predicted external temperature and a time-division model, calculating variable-based degree day (VBDD) daily power usage as predicted daily power usage corresponding to the control area on the basis of the predicted external temperature and a VBDD model, and calculating final power usage as final predicted power usage, which is consumed in the control area within the specific time section, on the basis of the time-division power usage and the VBDD daily power usage.

In accordance with one embodiment, the control area may be an area corresponding to a building, a store, at least one story belonging to the building, and at least one story belonging to the store.

In accordance with one embodiment, the time-division model may be generated on the basis of a time-division power usage regression equation, which is regressively derived from external temperature and power usage for each past time section.

In accordance with one embodiment, the time division power usage regression equation may further include a basic load component.

In accordance with one embodiment, the basic load component may indicate basic power usage of the control area which is not subject to external temperature.

In accordance with one embodiment, the calculating of the final power usage may include calculating a time-division daily predicted power usage by accumulating the time-division power usage, calculating a predicted daily power usage difference as a difference between the time-division daily predicted power usage and the VBDD daily power usage, and calculating the final power usage on the basis of the predicted daily power usage and the time-division power usage.

In accordance with one embodiment, the calculating of the final power usage on the basis of the predicted daily power usage difference and the time-division power usage may include calculating compensated power usage by dividing the predicted daily power usage difference by 24, and calculating the final power usage by adding the compensated power usage to the time-division power usage.

In accordance with one embodiment, the calculating of the final power usage on the basis of the predicted daily power usage difference and the time-division power usage may include calculating compensated power usage by multiplying the predicted daily power usage difference and a value, which is obtained by dividing the time-division power usage by the time-division daily predicted power usage, and calculating the final power usage by adding the compensated power usage to the time-division power usage.

FIG. 8 is an exemplary view illustrating a method of predicting power usage in accordance with one embodiment of this specification.

Referring to FIG. 8, a method of predicting power usage according to one embodiment of the present invention may include the following steps.

First, predicted external temperature corresponding to the control area in a specific time section may be acquired (S110).

Next, on the basis of the predicted external temperature and a time-division model, time-division power usage as predicted power usage which is consumed in the control area within the specific time section through the at least one facility (S120).

On the basis of the predicted external temperature and a variable-based degree day (VBDD) mode, VBDD daily power usage as predicted daily power usage corresponding to the control area may be calculated (S130).

Final power usage which is final predicted power usage which is consumed in the control area within the specific time section may be calculated on the basis of the time-division power usage and the VBDD daily power usage (S140).

The technology disclosed herein will briefly be described. The technology disclosed herein may predict daily power usage on the basis of the variable-based degree day (VBDD), and compare the predicted daily power usage with the sum of time-based predicted results of a time-division model, thereby enhancing accuracy of a time-based prediction.

For a uniform adjustment, a difference of daily prediction values obtained based on the VBDD prediction result and the time-based prediction result is divided equally by 24, to be reflected to the time-based prediction result (see the following equation).

Elec_Hour(Hour)=Elec_Hour(Hour)+Diff_VBD-
D_Hourly(Day)/24

Next, for a non-uniform adjustment, the difference of the daily prediction values obtained based on the VBDD prediction result and the time-based prediction result is reflected in a non-uniform manner. Here, the difference is reflected in proportion to a size of the time-based prediction result value (see the following equation).

Elec_Hour(Hour)=Elec_Hour(Hour)+Diff_VBD-
D_Hourly(Day)*(Elec_Hour(Hour)/Elec_Sum_
Hourly(Day))

Here, Elec_Hour(Hour) denotes a time-based prediction value, Elec_Sum_Hour(Day) denotes predicted daily power usage obtained by the sum of time-based prediction results, Elec_VBDD(Day) denotes predicted daily power usage obtained based on the VBDD, and Diff_VBDD_Hourly (Day) denotes a difference between the VBDD-based daily prediction value and the time-based prediction value.

In accordance with a central control apparatus and a facility control system for controlling facilities according to one embodiment disclosed herein, more accurate power usage prediction can be allowed in a manner of calculating time-division power usage as predicted power usage, which is a power consumption by the at least one facility in the control area within a specific time section, on the basis of predicted external temperature corresponding to the control area in the specific time section and a time-division model, calculating variable-based degree day (VBDD) daily power usage as predicted daily power usage corresponding to the control area on the basis of the predicted external temperature and a VBDD model, and calculating final power usage as final predicted power usage which his consumed in the control area within the specific time section on the basis of the time-division power usage and the VBDD daily power usage.

It should also be understood that the above-described embodiments are not limited by any of the details of the foregoing description, unless otherwise specified, and therefore all changes and modifications that fall within the metes and bounds of the claims, or equivalents of such metes and bounds are therefore intended to be embraced by the appended claims.

The invention claimed is:

1. A central control apparatus for controlling at least one facility that is installed in a control area and consumes energy, the apparatus comprising:
   a weather information acquiring unit that is configured to acquire predicted external temperature corresponding to the control area in a specific time section; and
   a controller that is configured to:
   calculate time-division power usage as predicted power usage, which is a power consumption by the at least one facility in the control area within the specific time section, on the basis of the predicted external temperature and a time-division model;
   calculate variable-based degree day (VBDD) daily power usage as predicted daily power usage corresponding to the control area on the basis of the predicted external temperature and a variable-based degree day (VBDD) model; and
   calculate final power usage as final predicted power usage, which is consumed in the control area within the specific time section, on the basis of the time-division power usage and the variable-based degree day (VBDD) daily power usage,
   wherein the controller is configured to:
   calculate time-division daily predicted power usage by accumulating the time division power usage;
   calculate a predicted daily power usage difference as a difference between the time-division daily usage and the variable-based degree day (VBDD) daily power usage; and
   calculate the final power usage on the basis of the predicted daily power usage difference and the time-division power usage.

2. The apparatus of claim 1, wherein the control area is an area corresponding to a building, a store, at least one story belonging to the building, and at least one story belonging to the store.

3. The apparatus of claim 1, further comprising a memory that is configured to store therein external temperature and power usage for each past time section,
   wherein the time-division model is generated on the basis of a time-division power usage regression equation, which is regressively derived from the external temperature and the power usage for each past time section.

4. The apparatus of claim 3, wherein the time division power usage regression equation further includes a basic load component indicating basic power usage of the control area that is not subject to external temperature.

5. The apparatus of claim 1, wherein the controller is configured to: calculate compensated power usage by dividing the predicted daily power usage difference by 24; and
   calculate the final power usage by adding the compensated power usage to the time-division power usage.

6. The apparatus of claim 1, wherein the controller is configured to:
   calculate compensated power usage by multiplying the predicted daily power usage difference and a value, which is obtained by dividing the time-division power usage by the time-division daily predicted power usage; and
   calculate the final power usage by adding the compensated power usage to the time-division power usage.

7. A facility control system comprising:
   at least one facility that is installed in a control area and consumes energy; and
   a central control apparatus that is configured to control the at least one facility,
   wherein the control area is an area corresponding to a building, a store, at least one story belonging to the building, and at least one story belonging to the store,
   wherein the central control apparatus comprises:
   a weather information acquiring unit that is configured to acquire predicted external temperature corresponding to the control area in a specific time section; and
   a controller that is configured to:
   calculate time-division power usage as predicted power usage, which is a power consumption by the at least one facility in the control area within the specific time section, on the basis of the predicted external temperature and a time-division model;
   calculate variable-based degree day (VBDD) daily power usage as predicted daily power usage corresponding to the control area on the basis of the predicted external temperature and a variable-based degree day (VBDD) model; and calculate final power usage as final predicted power usage, which is consumed in the control area within the specific time section on the basis of the time-division power usage and the variable-based degree day (VBDD) daily power usage,
   wherein the controller is configured to:
   calculate time-division daily predicted power usage by accumulating the time-division power usage;
   calculate a predicted daily power usage difference as a difference between the time-division daily predicted power usage and the variable-based degree day (VBDD) daily power usage; and
   calculate the final power usage on the basis of the predicted daily power usage difference and the time-division power usage.

8. The system of claim 7, wherein the controller is configured to calculate compensated power usage by dividing the predicted daily power usage difference by 24, or by multiplying the predicted daily power usage difference and a value, which is obtained by dividing the time-division power usage by the time-division daily predicted power usage, and
   wherein the controller is configured to calculate the final power usage by adding the compensated power usage to the time-division power usage.

9. A method for predicting power usage in a method for predicting power usage for each time section, performed by a central control apparatus for controlling at least one facility which is installed in a control area and consumes energy, the method comprising:
   acquiring predicted external temperature corresponding to the control area in a specific time section;
   calculating time-division power usage as predicted power usage, which is power consumption by the at least one facility in the control area within the specific time section, on the basis of the predicted external temperature and a time-division model;

calculating variable-based degree day (VBDD) daily power usage as predicted daily power usage corresponding to the control area on the basis of the predicted external temperature and a variable-based degree day (VBDD) model;

and calculating final power usage as final predicted power usage, which is consumed in the control area within the specific time section, on the basis of the time-division power usage and the variable-based degree day (VBDD) daily power usage, wherein the control area is an area corresponding to a building, a store, at least one story belonging to the building, and at least one story belonging to the store, wherein the calculating of the final power usage comprises:

calculating time-division daily predicted Dower usage by accumulating the time-division power usage;

calculating a predicted daily power usage difference as a difference between the time-division daily predicted power usage and the variable-based degree day (VBDD) daily power usage; and calculating the final power usage on the basis of the predicted daily power usage difference and the time-division power usage.

10. The method of claim 9, wherein the time-division model is generated on the basis of a time-division power usage regression equation, which is regressively derived from external temperature and power usage for each past time section.

11. The method of claim 10, wherein the time division power usage regression equation further includes a basic load component indicating basic power usage of the control area that is not subject to external temperature.

12. The method of claim 9, wherein the calculating of the final power usage on the basis of the predicted daily power usage difference and the time-division power usage comprises:

calculating compensated power usage by dividing the predicted daily power usage difference by 24; and calculating the final power usage by adding the compensated power usage to the time-division power usage.

13. The method of claim 9, wherein the calculating of the final power usage on the basis of the predicted daily power usage difference and the time-division power usage comprises:

calculating compensated power usage by multiplying the predicted daily power usage difference and a value, which is obtained by dividing the time-division power usage by the time-division daily predicted power usage; and calculating the final power usage by adding the compensated power usage to the time-division power usage.

* * * * *